United States Patent
Momose

(10) Patent No.: US 10,215,615 B2
(45) Date of Patent: Feb. 26, 2019

(54) STANDARD SIGNAL GENERATOR

(71) Applicant: Azbil Corporation, Tokyo (JP)

(72) Inventor: Osamu Momose, Tokyo (JP)

(73) Assignee: Azbil Corporation, Tokyo (JP)

( * ) Notice: Subject to any disclaimer, the term of this patent is extended or adjusted under 35 U.S.C. 154(b) by 542 days.

(21) Appl. No.: 14/924,253

(22) Filed: Oct. 27, 2015

(65) Prior Publication Data

US 2016/0116325 A1 Apr. 28, 2016

(30) Foreign Application Priority Data

Oct. 28, 2014 (JP) .................. 2014-218951

(51) Int. Cl.
 *G01F 1/60* (2006.01)
 *G01F 25/00* (2006.01)
(52) U.S. Cl.
 CPC ............ *G01F 25/0007* (2013.01); *G01F 1/60* (2013.01)
(58) Field of Classification Search
 CPC ................ G01F 25/0007; G01F 1/60
 See application file for complete search history.

(56) References Cited

U.S. PATENT DOCUMENTS

| | | | | |
|---|---|---|---|---|
| 4,283,619 A | * | 8/1981 | Abe ...................... | F02P 19/025 123/179.21 |
| 5,844,143 A | * | 12/1998 | Tomita ...................... | G01F 1/60 73/861.12 |
| 2008/0155294 A1 | * | 6/2008 | Kikuchi .................... | G06F 1/30 713/340 |

FOREIGN PATENT DOCUMENTS

| | | | | |
|---|---|---|---|---|
| CN | 1673695 A | * | 9/2005 | |
| JP | 60247119 A | * | 12/1985 | .............. G01F 1/60 |
| JP | H7-146165 A | | 6/1995 | |
| JP | H11-142199 A | | 5/1999 | |
| JP | 2004-061450 A | | 2/2004 | |

OTHER PUBLICATIONS

Japanese Application No. 2014-218951, filed Oct. 28, 2014.

* cited by examiner

*Primary Examiner* — Justin Seo
*Assistant Examiner* — John M Royston
(74) *Attorney, Agent, or Firm* — Amster, Rothstein & Ebenstein LLP

(57) ABSTRACT

To realize a stable operation and the suppression of heat generation in the case where an excitation current supplied from a converter is used to generate a power source voltage, a standard signal generator is provided. The standard signal generator includes an input circuit that includes: a rectification circuit that rectifies an excitation current; a resistor that is provided between a power source voltage output terminal for supplying a power source voltage and an output terminal of the rectification circuit; an amplification circuit that outputs an output voltage obtained by amplifying a voltage across both ends of the resistor; and a constant voltage circuit that performs control such that the power source voltage is constant. A power source voltage switch switches the power source voltage with the constant voltage circuit being controlled in accordance with the result of a comparison between the output voltage and a prescribed threshold value.

20 Claims, 16 Drawing Sheets

STANDARD SIGNAL GENERATOR

CROSS-REFERENCE TO RELATED APPLICATION

The present application claims the benefit of, and priority to, Japanese Patent Application No. 2014-218951, filed on Oct. 28, 2014, the entire contents of which are incorporated by reference herein.

The present invention relates to a standard signal generator for calibrating a converter of an electromagnetic flowmeter.

BACKGROUND ART

FIG. 12(A) is a block diagram illustrating the configuration of a conventional electromagnetic flowmeter. The electromagnetic flowmeter is configured from a detector 1 and a converter 2. The detector 1 is configured from an excitation coil 10 that generates a magnetic field, and a measurement tube 11 that is arranged in the magnetic field generated from the excitation coil 10, and that detects an electromotive force generated by a measurement-target fluid flowing through this magnetic field, and outputs a flow-rate signal that is proportional to the flow velocity thereof. The converter 2 supplies an excitation current such as that illustrated in FIG. 12(B) to the excitation coil 10 of the detector 1, and converts a flow rate signal such as that of FIG. 12(C) input from the detector 1 into an analog signal or a digital signal that indicates the flow rate or flow velocity of the fluid.

The flow-rate signal that is input from the detector 1 to the converter 2 is a very small μV-order signal, and therefore measurement precision is liable to deteriorate due to changes that occur with the aging of the electrical components used in the converter 2. Thus, a standard signal generator (hereinafter, a calibrator) is used at the site where the electromagnetic flowmeter is installed to periodically perform calibration as described below (see Patent Document 1).

In the calibration work, first, instead of the detector 1, a calibrator 3 having a configuration such as that illustrated in FIG. 13(A) is connected to the converter 2. The calibrator 3 is configured from: an input circuit 30 that receives an excitation current such as that of FIG. 13(B) input from the converter 2; a central processing unit (CPU) 31 that generates a reference flow-rate signal; an output circuit 32 that outputs the reference flow-rate signal generated by the CPU 31; a setting/display device 33 for setting the calibrator 3 and displaying information to a calibration worker; a power source circuit 34; and a battery 35. The calibration worker uses the setting/display device 33 to set, in the calibrator 3, information regarding the model of the converter 2 and a flow velocity value at a calibration point.

The CPU 31 of the calibrator 3 outputs a reference flow-rate signal corresponding to the set flow velocity value in synchronization with an excitation current that is input from an XY terminal of the converter 2 by way of the input circuit 30. This reference flow-rate signal is input to the converter 2 as a signal such as that illustrated in FIG. 13(C) by way of the output circuit 32. The calibration worker confirms data that is output from the converter 2 in accordance with the reference flow-rate signal, and confirms whether or not the measurement precision of the converter 2 is within a permitted range. If necessary, the converter 2 is readjusted in accordance with this confirmation result.

It is necessary for one calibrator 3 to correspond to a plurality of models of converters 2; however, there are a variety of excitation currents according to the models. In a standard type of four-wire electromagnetic flowmeter, the excitation current is of the order of ±100 to 200 mA; however, in a fluid-noise countermeasure type of electromagnetic flowmeter that is used for fluids in which solid bodies such as paper pulp are mixed, an excitation current of ±300 mA or greater is passed to improve the S/N ratio. In contrast, in a two-wire electromagnetic flowmeter in which there is a limit to the current that can be used, the excitation current is of the order of ±3.5 to 12 mA (see Patent Document 2). If the excitation current differs, the flow-rate signal level also differs even if the fluid flow velocity is the same, and therefore it is necessary for the calibrator 3 to output a flow-rate signal that corresponds to the model of the converter 2 and a set flow velocity value.

Furthermore, there is a decrease in the average current consumption value in two-wire electromagnetic flowmeters and battery-type electromagnetic flowmeters, and therefore there are also types in which an excitation current pause period (=0 mA) is provided (see Patent Document 3). It is necessary for the flow-rate signal output by the calibrator 3 to also be set to zero during this pause period.

It is necessary for the calibrator 3 to be small and lightweight such that work can be easily carried out at the installation site, and therefore it is not possible for large components such as the excitation coil of the detector 1 to be housed therein. Thus, the input circuit 30 of the calibrator 3 is an extremely simple circuit such as that illustrated in FIG. 14. To be specific, diodes D100 and D101 that are connected in parallel in opposing directions and a parallel resistor R100 are components that are provided instead of the excitation coil of the detector 1, and an excitation current $I_{ex}$ flows through these components. A voltage VAD that is unipolarized with an offset voltage being added to the voltage $V_{xy}$ across both ends of these components (XY interterminal voltage) due to resistors R101 and R102 and a capacitor C100 is input to an A/D converter housed inside the CPU 31, and polarity changes and pause periods of the excitation current $I_{ex}$ are detected.

FIGS. 15(A) to 15(C) illustrate examples of operation waveforms when the calibrator 3 is connected to the converter 2 (excitation current $I_{ex}$ is ±150 mA) of a four-wire standard type of electromagnetic flowmeter. FIG. 15(A) illustrates the excitation current $I_{ex}$, FIG. 15(B) illustrates the XY interterminal voltage $V_{xy}$ of the converter 2, and FIG. 15(C) illustrates the output voltage VAD of the input circuit 30.

Since the input circuit 30 has the configuration illustrated in FIG. 14, even when a large excitation current $I_{ex}$ flows to the input circuit 30 as in the case where the converter 2 of a four-wire standard type of electromagnetic flowmeter or the converter 2 of a fluid-noise countermeasure type of electromagnetic flowmeter is connected to the calibrator 3, the XY interterminal voltage $V_{xy}$ is suppressed to less than ±1 V due to the IF-VF (forward current-forward voltage) characteristics of the diodes D100 and D101, and therefore the diodes D100 and D101 and other internal components do not generate heat.

Furthermore, in the case where the excitation current $I_{ex}$ is small as in when the converter 2 of a two-wire electromagnetic flowmeter is connected to the calibrator 3, the diodes D100 and D101 enter a near-high impedance state, and therefore the output voltage VAD of the input circuit 30 exhibits near-linear characteristics and it becomes possible for polarity changes and pause periods to be detected. FIG. 16(A) and FIG. 16(B) illustrate the characteristics of the XY interterminal voltage $V_{xy}$ and the output voltage VAD when the excitation current $I_{ex}$ is made to change from −300 mA to +300 mA as indicated by the horizontal axis.

In calibration work in which the calibrator 3 such as that described above is used, there are cases where a commercial power source is not able to be obtained at the installation site of the electromagnetic flowmeter, and in order for calibration work to be possible even at such sites, the battery 35 is used as a power source for the calibrator 3, and the voltages required for each section of the calibrator 3 are generated by the power source circuit 34.

PRIOR ART DOCUMENTS

Patent Documents

[Patent Document 1] Japanese Unexamined Patent Application Publication No. H7-146165.
[Patent Document 2] Japanese Unexamined Patent Application Publication No. 2004-61450.
[Patent Document 3] Japanese Unexamined Patent Application Publication No. H11-142199.

SUMMARY OF INVENTION

Problems to be Solved by the Invention

A battery is used as a power source in conventional calibrators, and therefore there has been a problem in that it is no longer possible for calibration work to be performed when the battery runs out on site. A method in which an excitation current supplied from a converter is used to generate a power source voltage is feasible as a method to solve this problem.

However, in the case where an excitation current supplied from a converter is used, if the converter is a converter of a two-wire electromagnetic flowmeter, the supplied excitation current is small and therefore, although the amount of heat generated by the power source circuit provided in the calibrator is small, there has been a possibility of the voltage (power) required for operation as a calibrator no longer being able to be obtained. Furthermore, if the converter is a converter of a four-wire electromagnetic flowmeter, the supplied excitation current is large and therefore there has been a possibility of the heat generated by the power source circuit inside the calibrator increasing.

The present invention has been devised in order to solve the aforementioned problems, and an object thereof is to provide a standard signal generator that is capable of realizing a stable operation and the suppression of heat generation in the case where an excitation current supplied from a converter is used to generate a power source voltage.

Means for Solving the Problems

The present invention is a standard signal generator that generates a reference flow-rate signal for calibrating an electromagnetic flowmeter, characterized in that the standard signal generator is provided with: an input circuit that receives an excitation current from a converter of the electromagnetic flowmeter; a control means that generates a reference flow-rate signal synchronized with the excitation current; and a power source voltage switching means; the input circuit is provided with: a first rectification circuit that rectifies the excitation current; a first resistor that is provided between a power source voltage output terminal for supplying a power source voltage used by the standard signal generator and an output terminal of the first rectification circuit; an amplification circuit that outputs a first output voltage obtained by amplifying a voltage across both ends of the first resistor thereof; and a constant voltage circuit that performs control such that the power source voltage that is output from the power source voltage output terminal is constant, and the power source voltage switching means switches the power source voltage with the constant voltage circuit being controlled in accordance with a result of a comparison between the first output voltage and a prescribed first threshold value.

Furthermore, one configuration example of the standard signal generator of the present invention is characterized in that the power source voltage switching means sets the power source voltage to a prescribed first level when the first output voltage is equal to or greater than the first threshold value, and sets the power source voltage to a prescribed second level that is higher than the first level when the first output voltage is less than the first threshold value.

Furthermore, one configuration example of the standard signal generator of the present invention is characterized in that the constant voltage circuit is provided with: a transistor that is provided between the power source voltage output terminal and a ground; and a shunt regulator that controls a gate voltage of the transistor with a voltage obtained by resistance-dividing the power source voltage that is output from the power source voltage output terminal serving as a reference input, and the power source voltage switching means switches the power source voltage by changing the reference input of the shunt regulator in accordance with the result of the comparison between the first output voltage and the first threshold value.

Furthermore, one configuration example of the standard signal generator of the present invention is characterized by being further provided with: a battery for supplying power; and a power source voltage supply source switching means that switches a supply source of the power source voltage from the constant voltage circuit of the input circuit to the battery when the first output voltage is compared with a prescribed second threshold value and it is determined that there is a current supply shortage with the excitation current.

Furthermore, one configuration example of the standard signal generator of the present invention is characterized in that the control means determines a model of the converter connected to the standard signal generator in accordance with the first output voltage that is output from the input circuit, and generates a reference flow-rate signal corresponding to the determined model and outputs the reference flow-rate signal to the converter.

Furthermore, one configuration example of the standard signal generator of the present invention is characterized in that the control means, when having determined that the converter of the electromagnetic flowmeter connected to the standard signal generator is a converter of a two-wire electromagnetic flowmeter, generates a reference flow-rate signal corresponding to a value of the excitation current indicated by the first output voltage and outputs the reference flow-rate signal to the converter.

Furthermore, one configuration example of the standard signal generator of the present invention is characterized in that the input circuit is further provided with: a second rectification circuit that rectifies only the positive polarity side of the excitation current; a second resistor that is provided between an output terminal of this second rectification circuit and the ground; a third rectification circuit that rectifies only the negative polarity side of the excitation current; and a third resistor that is provided between an output terminal of this third rectification circuit and the ground; and the control means determines the polarity of the excitation current in accordance with a second output voltage that is the voltage across both ends of the second resistor and a third output voltage that is the voltage across both ends of the third resistor, generates and outputs a positive-polarity reference flow-rate signal to the converter when having determined that the excitation current has a positive polarity, and generates and outputs a negative-polarity reference flow-rate signal to the converter when having determined that the excitation current has a negative polarity.

Effects of the Invention

According to the present invention, it becomes possible to drive a standard signal generator without a battery by using an excitation current supplied from a converter to generate a power source voltage. Accordingly, the problem of it not being possible to perform calibration work due to a battery running out is resolved. Furthermore, in the present invention, the power source voltage can be switched by controlling the constant voltage circuit in accordance with the result of a comparison between the first output voltage and the prescribed first threshold value. Accordingly, with the present invention, it is possible to increase the power source voltage when the converter connected to the standard signal generator is a converter of a two-wire electromagnetic flowmeter, and therefore the power required for the operation of the standard signal generator can be supplied without any problems, and the occurrence of trouble such as the operation of the standard signal generator stopping due to a power supply shortage no longer occurs. Furthermore, in the present invention, it is possible to decrease the power source voltage when the converter connected to the standard signal generator is a converter of a four-wire electromagnetic flowmeter, and it is therefore possible to suppress heat generated by the standard signal generator and to suppress temperature drifts in electrical circuits due to internal heat generation, and it is subsequently possible to reduce the impact on the performance of the standard signal generator caused by temperature drifts.

Furthermore, in the present embodiment, when the first output voltage is compared with the prescribed second threshold value and it is determined that there is a current supply shortage with the excitation current, the supply source of the power source voltage is switched from the constant voltage circuit of the input circuit to the battery, and it is thereby possible to prevent the occurrence of a shortage of the power required for the operation of the standard signal generator. In the present invention, it is possible to eliminate the occurrence of trouble such as the operation of the standard signal generator stopping due to a power supply shortage even when the excitation current is within a lower range of the current supplied from the converter of a two-wire electromagnetic flowmeter. Furthermore, a power source voltage is supplied from the battery in an excitation current pause period, and therefore it is possible to eliminate the occurrence of trouble such as the operation of the standard signal generator stopping even when the pause period is long. Furthermore, in the present invention, power is not supplied from the battery when the excitation current is within a range of the current supplied from the converter of a four-wire electromagnetic flowmeter or is within a lower range or greater of the current supplied from the converter of a two-wire electromagnetic flowmeter, and therefore the consumption of the battery is able to be greatly reduced compared to the case where only a battery is used as a power source as in a conventional standard signal generator.

Furthermore, in the present invention, by providing the first rectification circuit, the first resistor, and the amplification circuit in the input circuit of the standard signal generator, the excitation current is able to be accurately measured at the control means side, and therefore the setting of the model of converter can be automated.

Furthermore, in the present invention, it is possible to output a highly precise first output voltage that is proportional to the magnitude of the excitation current, it is possible to generate a reference flow-rate signal that corresponds to the value of the excitation current and output the reference flow-rate signal to the converter, and it is possible to realize the calibration of a two-wire electromagnetic flowmeter within a total flow-rate measurement range.

Furthermore, in the present invention, by providing the second rectification circuit, the second resistor, the third rectification circuit, and the third resistor in the input circuit of the standard signal generator, the polarity of the excitation current is able to be accurately detected.

DESCRIPTION OF EMBODIMENTS

First Embodiment

Figure 1:
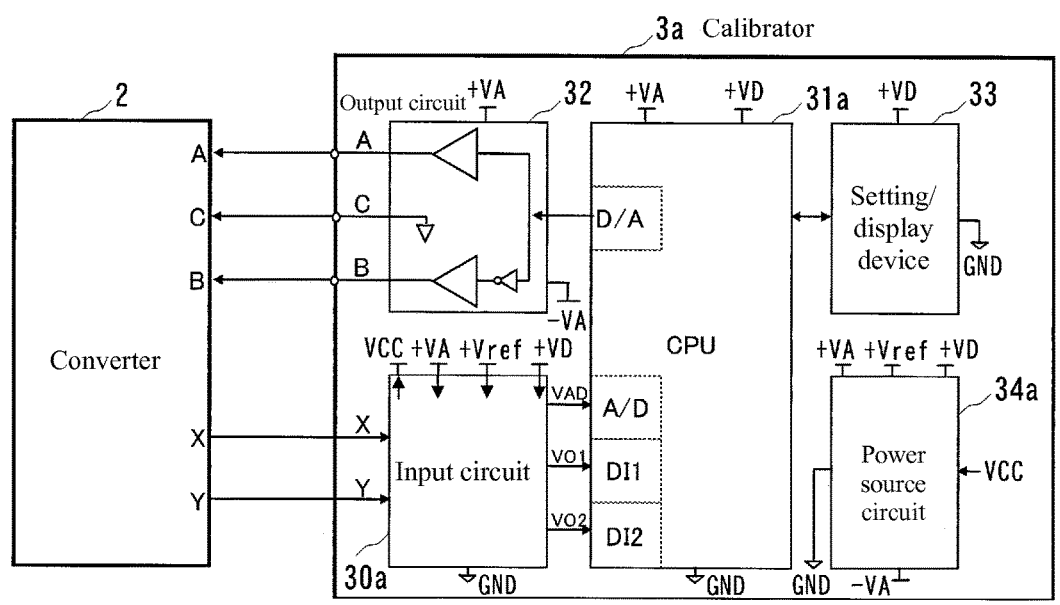
FIG. 1 is a block diagram illustrating the configuration of a calibrator according to a first embodiment of the present invention.
Figure 13:
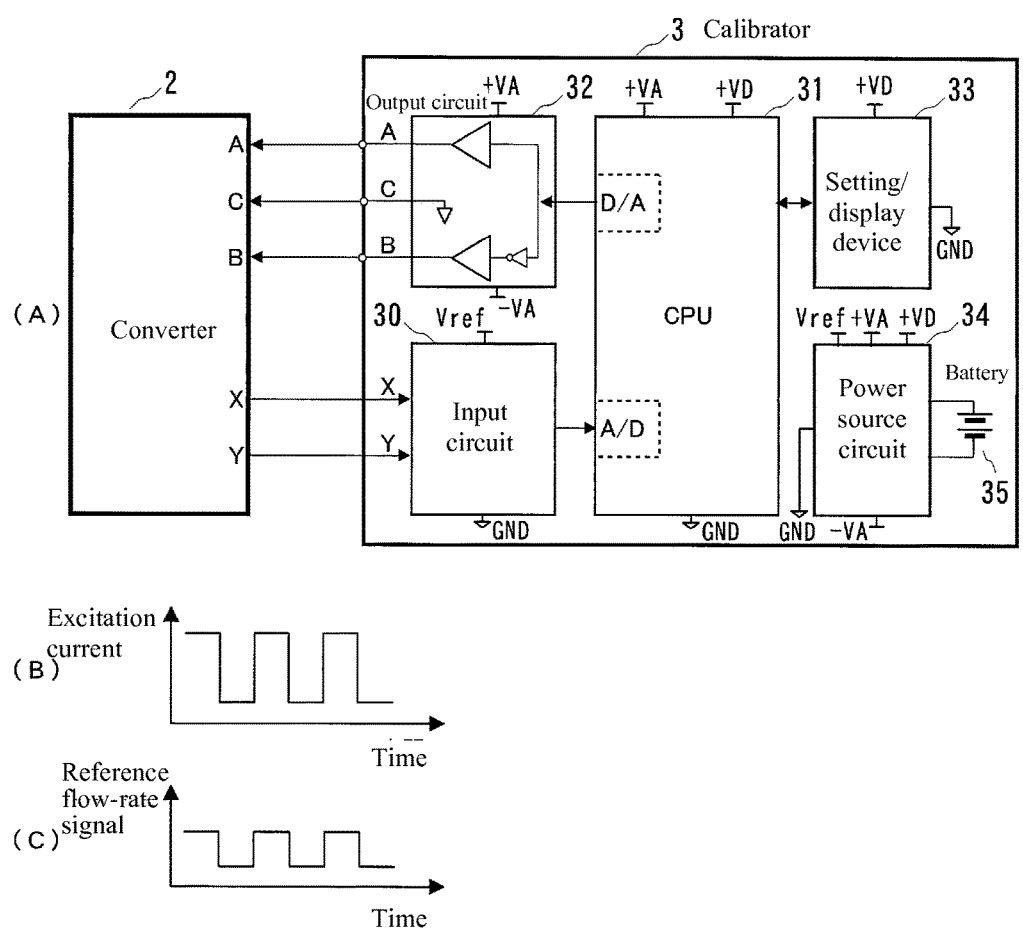
FIG. 13 is a block diagram illustrating the configuration of a conventional calibrator and drawings illustrating signal waveforms of each section of the calibrator.
Figure 14:
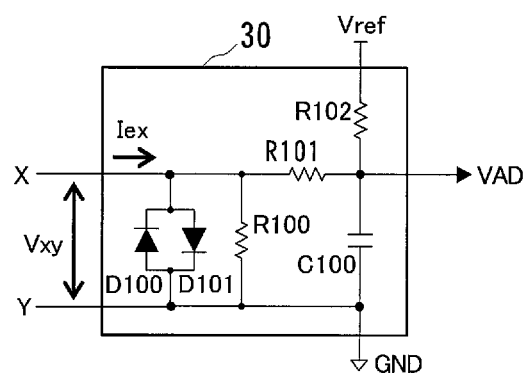
FIG. 14 is a circuit diagram illustrating the configuration of an input circuit of a conventional calibrator.
Figure 15:
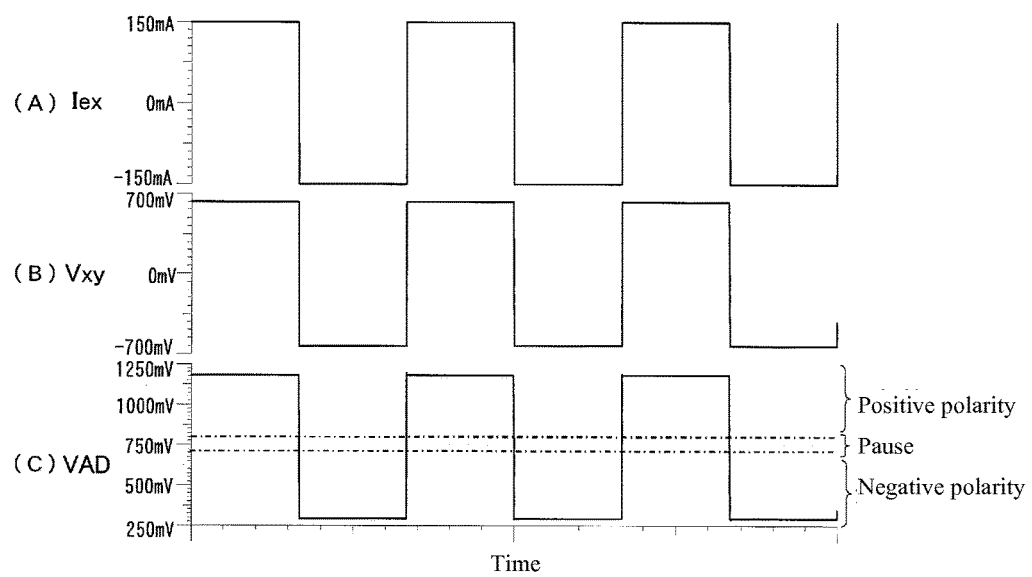
FIG. 15 is a drawing illustrating examples of operation waveforms when a calibrator is connected to a converter of a four-wire standard type of electromagnetic flowmeter.
Figure 16:
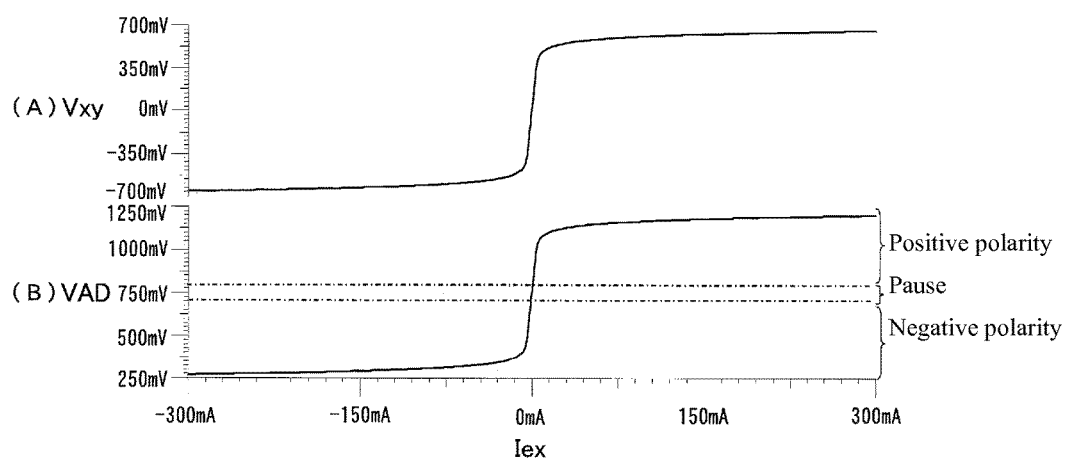
FIG. 16 is a drawing illustrating excitation current-output voltage characteristics of an input circuit of a conventional calibrator.

Hereinafter, embodiments of the present invention will be described with reference to the drawings. FIG. 1 is a block diagram illustrating the configuration of a calibrator according to a first embodiment of the present invention, and the same reference numerals are appended to the same components as in FIG. 13(A). A calibrator 3a of the present embodiment is configured from: an input circuit 30a which receives an excitation current that is input from a converter 2; a CPU 31a which is a control means that generates a reference flow-rate signal synchronized with the excitation current; an output circuit 32 which converts the reference flow-rate signal output from the CPU 31a into a differential signal and outputs the differential signal to the converter 2; a setting/display device 33 for setting the calibrator 3a and displaying information to a calibration worker; and a power source circuit 34a.

Figure 2:
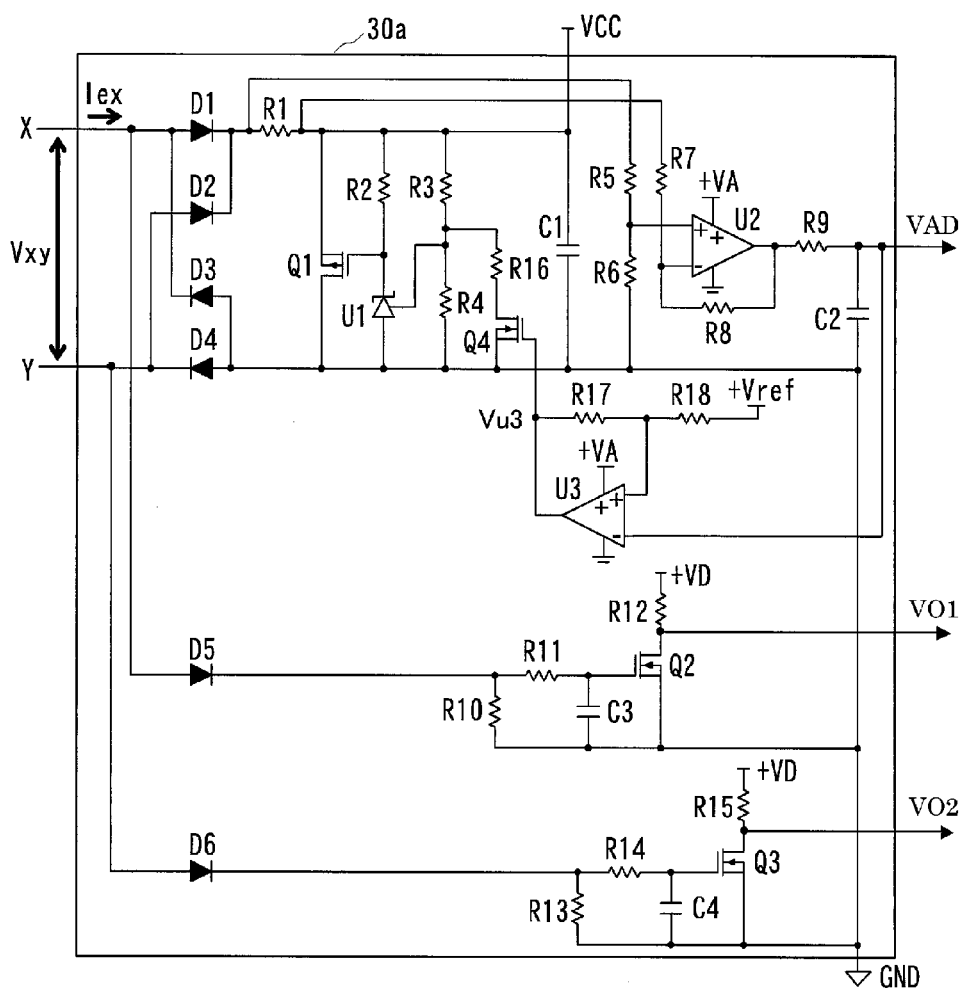
FIG. 2 is a circuit diagram illustrating the configuration of an input circuit of the calibrator according to the first embodiment of the present invention.

FIG. 2 is a circuit diagram illustrating the configuration of the input circuit 30a of the present embodiment. The input circuit 30a is configured from: a diode D1 having an anode connected to an input terminal X of the input circuit 30a; a diode D2 having an anode connected to an input terminal Y of the input circuit 30a and a cathode connected to a cathode of the diode D1; a diode D3 having a cathode connected to the input terminal X and an anode connected to ground; a diode D4 having a cathode connected to the input terminal Y and an anode connected to ground; a diode D5 having an anode connected to the input terminal X; a diode D6 having an anode connected to the input terminal Y; a resistor R1 having one end connected to the cathodes of the diodes D1 and D2 and the other end connected to a power source voltage output terminal of the input circuit 30a; resistors R2 and R3 having one end connected to the power source voltage output terminal; a resistor R4 having one end connected to the other end of the resistor R3 and the other end connected to ground; a shunt regulator U1 having a reference input terminal connected to a connection point between the resistors R3 and R4, an anode connected to ground, and a cathode connected to the other end of the resistor R2; a P-channel power MOS transistor Q1 having a gate connected to the other end of the resistor R2 and the cathode of the shunt regulator U1, a source connected to the power source voltage output terminal, and a drain connected to ground; a resistor R5 having one end connected to the cathodes of the diodes D1 and D2; a resistor R6 having one end connected to the other end of the resistor R5 and the other end connected to ground; a resistor R7 having one end connected to the power source voltage output terminal; an operational amplifier U2 having a power source voltage (+VA) supplied to a power source input terminal, a noninverting input terminal connected to a connection point between the resistors R5 and R6, and an inverting input terminal connected to the other end of the resistor R7; a resistor R8 having one end connected to the inverting input terminal of the operational amplifier U2 and the other end connected to an output terminal of the operational amplifier U2; a resistor R9 having one end connected to the output terminal of the operational amplifier U2 and the other end connected to a first signal output terminal of the input circuit 30a; a resistor R10 having one end connected to a cathode of the diode D5 and the other end connected to ground; a resistor R11 having one end connected to the cathode of the diode D5; an N-channel power MOS transistor Q2 having a gate connected to the other end of the resistor R11, a drain connected to a second signal output terminal of the input circuit 30a, and a source connected to ground; a resistor R12 having one end connected to a power source voltage (+VD) and the other end connected to the drain of the N-channel power MOS transistor Q2; a resistor R13 having one end connected to a cathode of the diode D6 and the other end connected to ground; a resistor R14 having one end connected to the cathode of the diode D6; an N-channel power MOS transistor Q3 having a gate connected to the other end of the resistor R14, a drain connected to a third signal output terminal of the input circuit 30a, and a source connected to ground; a resistor R15 having one end connected to the power source voltage (+VD) and the other end connected to the drain of the N-channel power MOS transistor Q3; a capacitor C1 having one end connected to the power source voltage output terminal and the other end connected to ground; a capacitor C2 having one end connected to the other end of the resistor R9 and the other end connected to ground; a capacitor C3 having one end connected to the other end of the resistor R11 and the other end connected to ground; a capacitor C4 having one end connected to the other end of the resistor R14 and the other end connected to ground; a comparator U3 having the power source voltage (+VA) supplied to a power source input terminal and an inverting input terminal connected to the first signal output terminal of the input circuit 30a; an N-channel power MOS transistor Q4 having a gate connected to an output terminal of the comparator U3 and a source connected to ground; a resistor R16 having one end connected to a connection point between the resistors R3 and R4 and the other end connected to a drain of the N-channel power MOS transistor Q4; a resistor R17 having one end connected to a noninverting input terminal of the comparator U3 and the other end connected to the output terminal of the comparator U3; and a resistor R18 having one end connected to a power source voltage (+$V_{ref}$) and the other end connected to the noninverting input terminal of the comparator U3.

Figure 3:
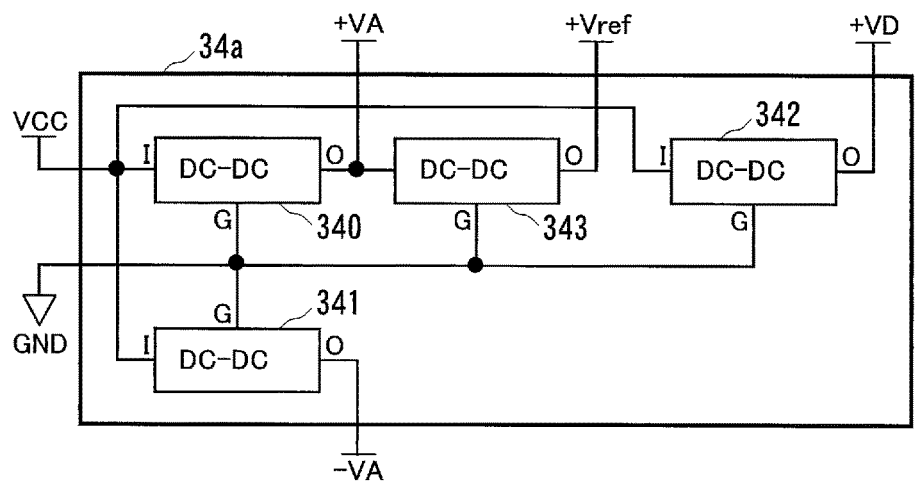
FIG. 3 is a block diagram illustrating the configuration of a power source circuit of the calibrator according to the first embodiment of the present invention.

FIG. 3 is a block diagram illustrating the configuration of the power source circuit 34a of the present embodiment. The power source circuit 34a is configured from a DC-DC converter 340 into which a direct-current power source voltage VCC that is output from the power source voltage output terminal of the input circuit 30a is input, and which then generates a direct-current power source voltage (+VA); a DC-DC converter 341 that has the direct-current power source voltage VCC input thereto, and generates a direct-current power source voltage (−VA); a DC-DC converter 342 that has the direct-current power source voltage VCC input thereto, and generates a direct-current power source voltage (+VD); and a DC-DC converter 343 that has the direct-current power source voltage (+VA) input thereto, and generates a direct-current power source voltage (+$V_{ref}$).

The DC-DC converters 340 and 342 are step-up types, the DC-DC converter 341 is a polarity-inverting type, and the DC-DC converter 343 is a step-down type of converter. The magnitude relationship between the power source voltages is a relationship of |VA|>VD>VCC. The power source voltage (+$V_{ref}$) is a voltage for setting a threshold value described hereinafter and therefore may be set as appropriate.

In the conventional calibrator 3, the polarity of the excitation current $I_{ex}$ and an approximate current value were measured with only one output of the input circuit 30 being input to the A/D converter of the CPU 31; however, in the present embodiment, the output of the input circuit 30a is divided into three and input to the A/D converter and an input port of the CPU 31a. Furthermore, in the present embodiment, the excitation current from the converter 2 is used to generate a power source voltage that is used by the calibrator 3a.

The diodes D1 to D4, the operational amplifier U2, the resistors R1 and R5 to R9, and the capacitor C2 constitute an input circuit for measuring the current value. In the input circuit for measuring the current value, an alternating-current excitation current $I_{ex}$ is rectified by a single-phase full-wave rectification circuit including the diodes D1 to D4, and the rectified current is converted into a voltage by the resistor R1 provided between an output terminal (cathodes of the diodes D1 and D2) of the single-phase full-wave rectification circuit and the power source voltage output terminal. This resistor R1 is set to a low resistance (1Ω, for example). It is thereby possible to suppress heat generated by the resistor R1 even in the case where a large excitation current $I_{ex}$ flows such as when the converter 2 of a four-wire fluid-noise countermeasure type of electromagnetic flowmeter is connected to the calibrator 3a.

The voltage level also decreases in proportion to the decrease in the resistor R1, and therefore the voltage across both ends of the resistor R1 is amplified by a differential amplification circuit, which includes the operational amplifier U2 and the resistors R5 to R8, to a level at which a required resolution can be obtained by an A/D converter of a subsequent stage. Types that are highly precise and exhibit low temperature characteristics are used for the operational amplifier U2 and the resistors R1 and R5 to R8, and it is thereby possible to improve flow-rate measurement precision.

A low-pass filter circuit, which includes the resistor R9 and the capacitor C2, subjects an output voltage of the operational amplifier U2 to low-pass filtering and outputs an output voltage VAD. The resistor R9 and the capacitor C2 have an appropriate time constant such that the A/D converter of the subsequent stage does not perform erroneous measurements due to external noise.

In this way, the input circuit for measuring the current value converts the excitation current $I_{ex}$ input from the converter 2 into a voltage, and inputs the converted output voltage VAD to the A/D converter of the CPU 31a. Although the polarity of the excitation current $I_{ex}$ is not able to be detected with this output voltage VAD, a highly precise output voltage VAD that is proportional to the magnitude of the excitation current $I_{ex}$ is output, and therefore highly precise measurement of the excitation current value becomes possible at the CPU 31a side. It should be noted that, in the input circuit for measuring the current value, the voltage across both ends of the resistor R1 is amplified and output as the output voltage VAD, and therefore the VF (forward voltage) characteristics of the diodes D1 to D4 do not affect the precision of the measurement value. Furthermore, the low-pass filter circuit that includes the resistor R9 and the capacitor C2 is not an essential configuration, and the output voltage of the operational amplifier U2 may serve as an output voltage VAD1.

The diode D5, the N-channel power MOS transistor Q2, the resistors R10 to R12, and the capacitor C3 configure a input circuit for detecting positive polarity. In the input circuit for detecting positive polarity, only the positive polarity side of the alternating-current excitation current $I_{ex}$ is rectified by a single-phase half-wave rectification circuit that includes the diode D5, and the rectified current is converted into a voltage by the resistor R10.

A low-pass filter circuit that includes the resistor R11 and the capacitor C3 subjects the voltage across both ends of the resistor R10 to low-pass filtering. A voltage that has passed through this low-pass filter circuit is converted into an output voltage VO1 of a high level (+VD) or a low level (0 V) by the N-channel power MOS transistor Q2. To be specific, the output voltage VO1 is low level in the case where the excitation current $I_{ex}$ has a positive polarity, and the output voltage VO1 is high level in the case where the excitation current $I_{ex}$ has a negative polarity.

In this way, the input circuit for detecting positive polarity converts the excitation current $I_{ex}$ into a voltage, and inputs the converted output voltage VO1 to an input port DI1 of the CPU 31a. At the CPU 31a side, the output voltage VO1 is used only for determining the positive polarity of the excitation current $I_{ex}$. The resistor R11 and the capacitor C3 have an appropriate time constant such that the input port DI1 of a subsequent stage does not perform erroneous measurements due to external noise. It should be noted that the low-pass filter circuit that includes the resistor R11 and the capacitor C3 is not an essential configuration.

The diode D6, the N-channel power MOS transistor Q3, the resistors R13 to R15, and the capacitor C4 configure an input circuit for detecting negative polarity. In the input circuit for detecting negative polarity, only the negative polarity side of the alternating-current excitation current $I_{ex}$ is rectified by a single-phase half-wave rectification circuit that includes the diode D6, and the rectified current is converted into a voltage by the resistor R13.

A low-pass filter circuit including the resistor R14 and the capacitor C4 subjects the voltage across both ends of the resistor R13 to low-pass filtering. A voltage that has passed through this low-pass filter circuit is converted into an output voltage VO2 of a high level (+VD) or a low level (0 V) by the N-channel power MOS transistor Q3. To be specific, the output voltage VO2 is low level in the case where the excitation current $I_{ex}$ has a negative polarity, and the output voltage VO2 is high level in the case where the excitation current $I_{ex}$ has a positive polarity.

In this way, the input circuit for detecting negative polarity converts the excitation current $I_{ex}$ into a voltage, and inputs the converted output voltage VO2 to an input port DI2 of the CPU 31a. At the CPU 31a side, the output voltage VO2 is used only for determining the negative polarity of the excitation current $I_{ex}$. The resistor R14 and the capacitor C4 have an appropriate time constant such that the input port DI2 of a subsequent stage does not perform erroneous measurements due to external noise. It should be noted that the low-pass filter circuit that includes the resistor R14 and the capacitor C4 is not an essential configuration.

Pull-down resistors R10 and R13 have a high resistance (100 kΩ, for example). It is therefore impossible to ignore the excitation current $I_{ex}$ that flows through the resistors R10 and R13 without passing through the resistor R1. When the falling speed (the speed at which the transistors Q2 and Q3 switch from OFF to ON) of the output voltages VO1 and VO2 is delayed, the detection of switching in the polarity of the excitation current $I_{ex}$ is delayed; however, since the rising speed of the output voltages VO1 and VO2 may be delayed, there is no problem even when the resistors R10 and R13 have large resistance values.

Next, the shunt regulator U1, the P-channel power MOS transistor Q1, the resistors R2 to R4 and R16, and the capacitor C1 configure a constant voltage circuit that generates the direct-current power source voltage VCC from the excitation current $I_{ex}$. In the constant voltage circuit, a voltage (power source voltage VCC) having passed through the resistor R1 for detecting excitation current is divided by the voltage-dividing resistors R3, R4, and R16, and this divided voltage is input to a reference input terminal of the shunt regulator U1.

The shunt regulator U1 controls a gate voltage of the P-channel power MOS transistor Q1 such that the voltage that is input to the reference input terminal and an internal reference voltage are the same. As a result, control is performed such that the power source voltage VCC of the other end (power source voltage output terminal) of the resistor R1 is a set voltage. In this way, the power source voltage VCC is a constant value even if the value of the excitation current $I_{ex}$ input from the converter 2 changes. Furthermore, the capacitor C1 for smoothing is provided between the power source voltage output terminal and ground. The power source voltage VCC generated by the constant voltage circuit is supplied to the power source circuit 34a.

Although a current is no longer supplied in a pause period of the excitation current $I_{ex}$ (=0 mA), the pause period is ordinarily several hundred milliseconds or less, and therefore there is no problem as long as the power source during this period is maintained by the charge accumulated in the capacitor C1.

The DC-DC converter 340 of the power source circuit 34a has the power source voltage VCC that is output from the power source voltage output terminal of the input circuit 30a input thereto, and generates a power source voltage (+VA). This power source voltage (+VA) is supplied to the input circuit 30a, the CPU 31a, and the output circuit 32. The DC-DC converter 341 of the power source circuit 34a has the power source voltage VCC input thereto, and generates a power source voltage (−VA). This power source voltage (−VA) is supplied to the output circuit 32. The DC-DC converter 342 of the power source circuit 34a has the power source voltage VCC input thereto, and generates a power source voltage (+VD). This power source voltage (+VD) is supplied to the input circuit 30a, the CPU 31a, and the setting/display device 33. The DC-DC converter 343 of the power source circuit 34a has a power source voltage (+VA) input thereto, and generates a power source voltage (+$V_{ref}$). This power source voltage (+$V_{ref}$) is supplied to the input circuit 30a. By using the DC-DC converters 340 to 343 in this way, it is possible to implement stabilization with the DC-DC converters 340 to 343 even when there are some ripples in the power source voltage VCC.

Here, in the present embodiment, the power source voltage VCC is switched in accordance with the excitation current $I_{ex}$ from the converter 2. The push-pull output type of comparator U3, the N-channel power MOS transistor Q4, and the resistors R17 and R18 configure a power source voltage switching means.

When the output voltage VAD of the input circuit 30a is equal to or greater than a prescribed voltage threshold value TH1, the comparator U3 outputs a low level and switches the N-channel power MOS transistor Q4 to OFF. The voltage threshold value TH1 is set according to the power source voltage (+$V_{ref}$) and the resistors R17 and R18. The output voltage VAD being equal to or greater than the voltage threshold value TH1 indicates that the excitation current $I_{ex}$ is equal to or greater than a prescribed current threshold value (a current level that corresponds to the excitation current $I_{ex}$ output from the converter 2 of a four-wire electromagnetic flowmeter; 27 mA or greater, for example).

When the N-channel power MOS transistor Q4 switches to OFF, the voltage that is input to the reference input terminal of the shunt regulator U1 increases compared to the case where the transistor Q4 is ON, and therefore the shunt regulator U1 controls the gate voltage of the P-channel power MOS transistor Q1 in a direction in which the power source voltage VCC is decreased. Consequently, the power source voltage VCC decreases.

Furthermore, when the output voltage VAD of the input circuit 30a is less than the voltage threshold value TH1, the comparator U3 outputs a high level and switches the N-channel power MOS transistor Q4 to ON. The output voltage VAD being less than the voltage threshold value TH1 indicates that the excitation current $I_{ex}$ is less than the prescribed current threshold value (the current level that corresponds to the excitation current $I_{ex}$ output from the converter 2 of a two-wire electromagnetic flowmeter).

When the N-channel power MOS transistor Q4 switches to ON, the voltage that is input to the reference input terminal of the shunt regulator U1 decreases compared to the case where the transistor Q4 is OFF, and therefore the shunt regulator U1 controls the gate voltage of the P-channel power MOS transistor Q1 in a direction in which the power source voltage VCC is increased. Consequently, the power source voltage VCC increases.

Figure 4:
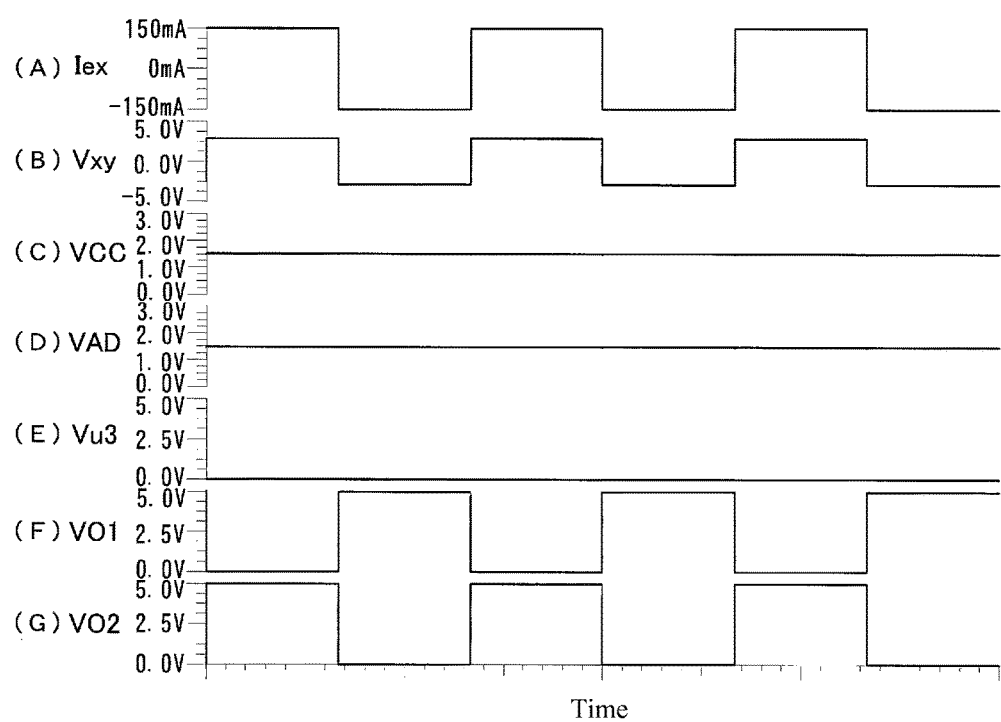
FIG. 4 is a drawing illustrating examples of operation waveforms of the input circuit of the calibrator according to the embodiment of the present invention.
Figure 5:
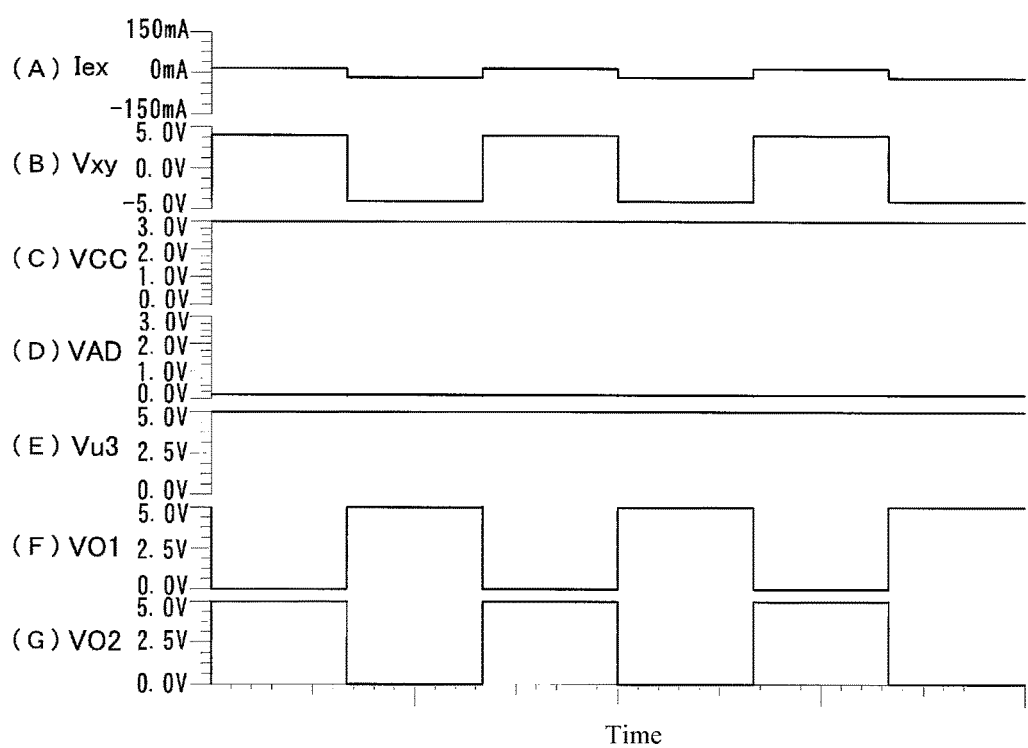
FIG. 5 is a drawing illustrating other examples of operation waveforms of the input circuit of the calibrator according to the embodiment of the present invention.
Figure 6:
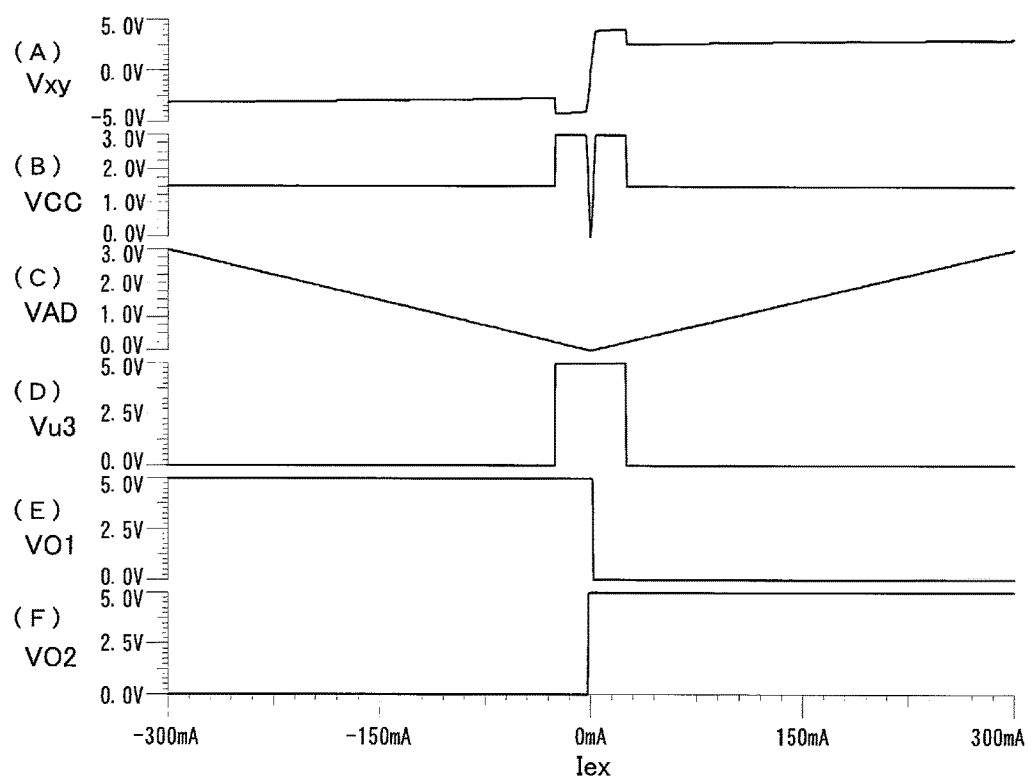
FIG. 6 is a drawing illustrating excitation current-output voltage characteristics of the input circuit of the calibrator according to the embodiment of the present invention.
Figure 7:
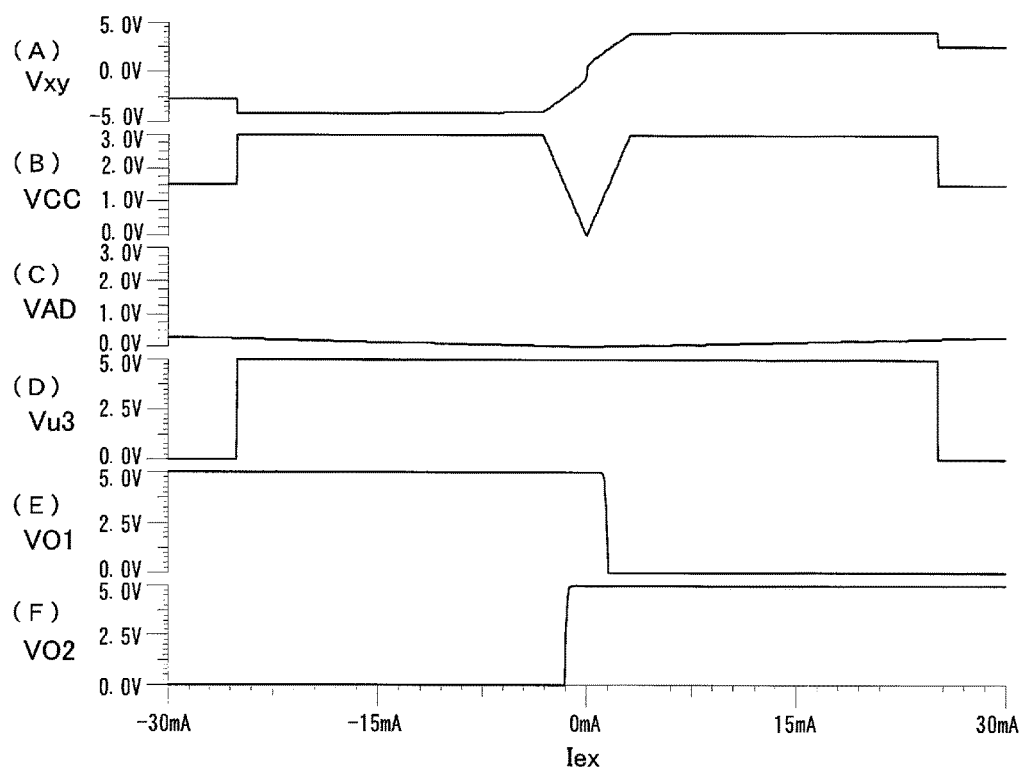
FIG. 7 is a drawing illustrating excitation current-output voltage characteristics of the input circuit of the calibrator according to the embodiment of the present invention.

FIGS. 4(A) to 4(G) and FIGS. 5(A) to 5(G) illustrate examples of operation waveforms of the input circuit 30a of the present embodiment. FIGS. 4(A) to 4(G) illustrate the case where the excitation current $I_{ex}$=±150 mA, and FIGS. 5(A) to 5(G) illustrate the case where the excitation current $I_{ex}$=±15 mA. FIGS. 4(A) and 5(A) illustrate the excitation current $I_{ex}$, FIGS. 4(B) and 5(B) illustrate the XY interminal voltage $V_{xy}$, FIGS. 4(C) and 5(C) illustrate the power source voltage VCC, FIGS. 4(D) and 5(D) illustrate the output voltage VAD, FIGS. 4(E) and 5(E) illustrate an output voltage Vu3 of the comparator U3, FIGS. 4(F) and 5(F) illustrate the output voltage VO1, and FIGS. 4(G) and 5(G) illustrate the output voltage V02.

Furthermore, FIGS. 6(A) to 6(F) illustrate the characteristics of the XY interterminal voltage $V_{xy}$, the power source voltage VCC, and the output voltages VAD, Vu3, VO1, and VO2 when the excitation current $I_{ex}$ is made to change from −300 mA to +300 mA as indicated by the horizontal axis. Furthermore, FIGS. 7(A) to 7(F) illustrate views in which regions where the excitation current $I_{ex}$ is −30 mA to +30 mA in FIGS. 6(A) to 6(F) are enlarged.

As described above, the power source voltage VCC decreases in the case where the excitation current $I_{ex}$ output from the converter 2 is within a range of the excitation current $I_{ex}$ output from the converter 2 of a four-wire electromagnetic flowmeter. The power source voltage VCC=1.5 V in the examples of FIGS. 4(A) to 4(G) and the examples where $I_{ex}$=+27 mA or greater and $I_{ex}$=−27 mA or less in FIGS. 6(A) to 6(F) and FIGS. 7(A) to 7(F).

On the other hand, the power source voltage VCC increases in the case where the excitation current $I_{ex}$ is within a range of the excitation current $I_{ex}$ output from the converter 2 of a two-wire electromagnetic flowmeter. The power source voltage VCC=3 V in the examples of FIGS. 5(A) to 5(G) and the examples where $I_{ex}$ is within ±25 mA in FIGS. 6(A) to 6(F) and FIGS. 7(A) to 7(F).

At such time, in the power source circuit 34a illustrated in FIG. 3, in the case where the total power P (total of each output voltage of +VA, −VA, −$V_{ref}$, +VD multiplied by each current) required for the operation of the calibrator 3a is 8 mW and the total efficiency η is 80%, the required input power is 8÷0.8=10 mW, and in the case where VCC=1.5 V, an input power shortage occurs when 6.7 mA or greater is not supplied as the excitation current $I_{ex}$. However, when VCC=3V, it is sufficient as long as 3.3 mA or greater is supplied as the excitation current $I_{ex}$, and a power source is able to be supplied even with the converter 2 of a two-wire electromagnetic flowmeter (excitation current $I_{ex}$=approximately 3.5 to 12 mA (see Patent Document 2)).

Next, the operation of the CPU 31a of the calibrator 3a of the present embodiment will be described. The CPU 31a executes the following processing according to a program stored in a memory (not illustrated) arranged inside or outside of the CPU 31a.

First, model setting processing will be described using the flowchart of FIG. 8. In the case of an automatic setting mode in which the model of the converter 2 is automatically distinguished and set (Y in step S100 of FIG. 8), the CPU 31a acquires the output voltage VAD from the input circuit 30a by way of the A/D converter (step S101 of FIG. 8). The calibration worker can decided in advance whether or not the automatic setting mode is to be implemented using the setting/display device 33. In the case where the automatic setting mode is not to be implemented, the calibration worker uses the setting/display device 33 to input information regarding the model of the converter 2 (step S102 of FIG. 8).

Figure 8:
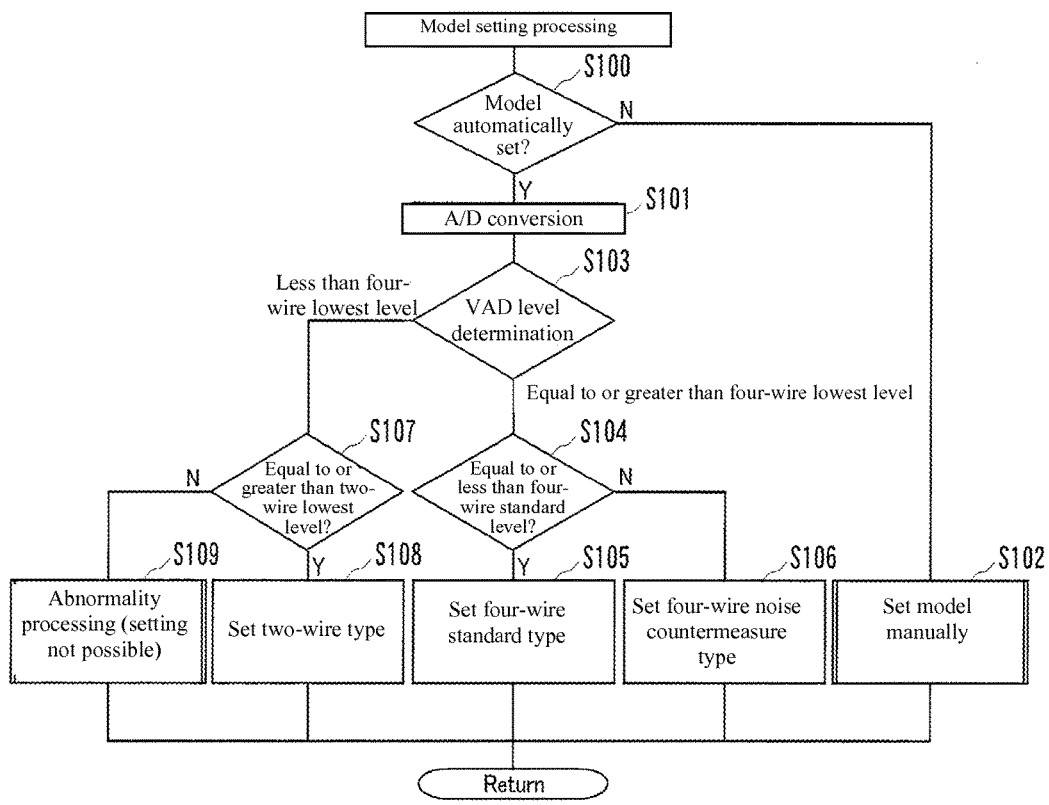
FIG. 8 is a flowchart describing model setting processing of the calibrator according to the embodiment of the present invention.

In the case where the automatic setting mode is to be implemented, the CPU 31a determines the level of the output voltage VAD acquired by way of the A/D converter (step S103 of FIG. 8). In the case where the output voltage VAD is equal to or greater than a lowest level corresponding to the converter 2 of a four-wire electromagnetic flowmeter and is within a range corresponding to the converter 2 of a four-wire standard type of electromagnetic flowmeter (Y in step S104 of FIG. 8), the CPU 31a determines that the converter 2 connected to the calibrator 3a is the converter 2 of a four-wire standard type of electromagnetic flowmeter (step S105 of FIG. 8). A determination of Y in step S104 indicates that the value of the excitation current indicated by the output voltage VAD is within a range of the excitation current $I_{ex}$ output from the converter 2 of a four-wire standard type of electromagnetic flowmeter.

Furthermore, in the case where the output voltage VAD is equal to or greater than the lowest level corresponding to the converter 2 of a four-wire electromagnetic flowmeter and is within a range corresponding to the converter 2 of a four-wire fluid-noise countermeasure type of electromagnetic flowmeter (N in step S104 of FIG. 8), the CPU 31a determines that the converter 2 connected to the calibrator 3a is the converter 2 of a four-wire fluid-noise countermeasure type of electromagnetic flowmeter (step S106 of FIG. 8). A determination of N in step S104 indicates that the value of the excitation current indicated by the output voltage VAD is within a range of the excitation current $I_{ex}$ output from the converter 2 of a four-wire fluid-noise countermeasure type of electromagnetic flowmeter.

Furthermore, in the case where the output voltage VAD is less than the lowest level corresponding to the converter 2 of a four-wire electromagnetic flowmeter and is within a range corresponding to the converter 2 of a two-wire electromagnetic flowmeter (Y in step S107 of FIG. 8), the CPU 31a determines that the converter 2 connected to the calibrator 3a is the converter 2 of a two-wire electromagnetic flowmeter (step S108 of FIG. 8). A determination of Y in step S107 indicates that the value of the excitation current indicated by the output voltage VAD is within a range of the excitation current $I_{ex}$ output from the converter 2 of a two-wire electromagnetic flowmeter.

In the case where the output voltage VAD is less than the lowest level corresponding to the converter 2 of a four-wire electromagnetic flowmeter and is less than the lowest level corresponding to the converter 2 of a two-wire electromagnetic flowmeter (N in step S107 of FIG. 8), the CPU 31a performs abnormality processing (step S109 of FIG. 8). In this abnormality processing, the calibration worker is notified via the setting/display device 33 that setting cannot be performed. With the above, the model setting processing terminates.

Next, flow-rate signal output processing will be described using the flowchart of FIG. 9. First, the CPU 31a acquires the output voltage VAD from the input circuit 30a by way of the A/D converter (step S200 of FIG. 9). The CPU 31a then determines the level of the output voltage VAD acquired by way of the A/D converter (step S201 of FIG. 9). In the case where the output voltage VAD is higher than a prescribed pause level, the CPU 31a determines the level of the output voltage VO1 acquired by way of the input port DI1 (step S202 of FIG. 9).

Figure 9:
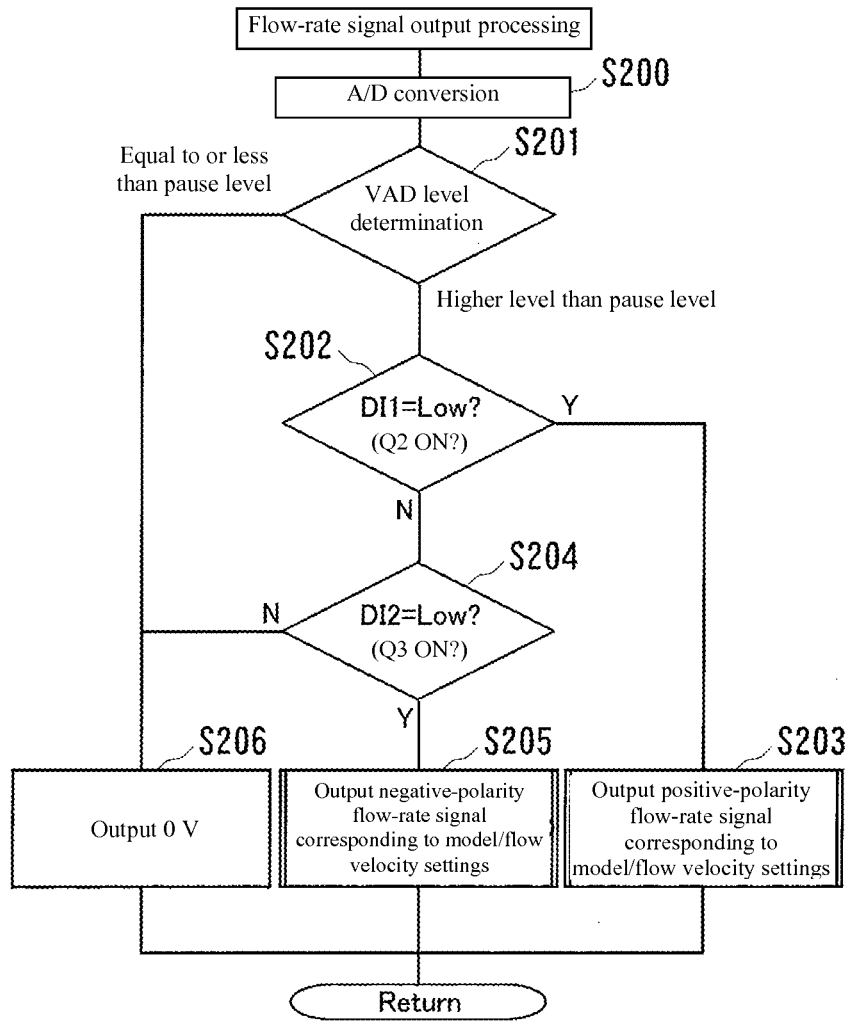
FIG. 9 is a flowchart describing flow-rate signal output processing of the calibrator according to the embodiment of the present invention.

In the case where the output voltage VO1 is low level (the case where the excitation current $I_{ex}$ output from the converter 2 has a positive polarity), the CPU 31a outputs a positive-polarity reference flow-rate signal corresponding to the model of the converter 2 determined in the model setting processing of FIG. 8 and a preset flow velocity value (step S203 of FIG. 9). This reference flow-rate signal is input to the converter 2 by way of a D/A converter of the CPU 31a and the output circuit 32.

In the case where the output voltage VO1 is high level rather than low level, the CPU 31a determines the level of the output voltage VO2 acquired by way of the input port DI2 (step S204 of FIG. 9). In the case where the output voltage VO2 is low level (the case where the excitation current $I_{ex}$ output from the converter 2 has a negative polarity), the CPU 31a outputs a negative-polarity reference flow-rate signal corresponding to the model of the converter 2 determined in the model setting processing of FIG. 8 and a preset flow velocity value (step S205 of FIG. 9).

It should be noted that, in the case where the converter 2 connected to the calibrator 3a is the converter 2 of a two-wire electromagnetic flowmeter, it is necessary to change the reference flow-rate signal in accordance with the value of the excitation current $I_{ex}$ even when the flow velocity setting value is the same (see Patent Document 2). Consequently, in the case where the converter 2 connected to the calibrator 3a is the converter 2 of a two-wire electromagnetic flowmeter and the excitation current $I_{ex}$ output from the converter 2 has a positive polarity, the CPU 31a outputs a positive-polarity reference flow-rate signal corresponding to the model of the converter 2 determined in the model setting processing of FIG. 8, the value of the excitation current $I_{ex}$ indicated by the output voltage VAD1, and a preset flow velocity value (step S203), and in the case where the excitation current $I_{ex}$ output from the converter 2 has a negative polarity, the CPU 31a outputs a negative-polarity reference flow-rate signal corresponding to the model of the converter 2 determined in the model setting processing of FIG. 8, the value of the excitation current $I_{ex}$ indicated by the output voltage VAD1, and a preset flow velocity value (step S205).

In the case where the output voltage VO2 is high level rather than low level, the CPU 31a sets the reference flow-rate signal to 0 V (step S206 of FIG. 9). Furthermore, the CPU 31a sets the reference flow-rate signal to 0 V also in the case where the output voltage VAD is equal to or less than the pause level (step S206). The CPU 31a carries out flow-rate signal output processing such as the above in synchronization with the excitation current $I_{ex}$ (output voltages VAD, VO1, and VO2 input from the input circuit 30a) from the converter 2.

As described above, in the present embodiment, by using the excitation current $I_{ex}$ supplied from the converter 2 to generate the power source voltage VCC, it becomes possible to drive the calibrator 3a without a battery. Consequently, the problem of it not being possible to perform calibration work due to a battery running out is resolved. Furthermore, in the present embodiment, the power source voltage VCC increases when the converter 2 connected to the calibrator 3a is the converter 2 of a two-wire electromagnetic flowmeter, and therefore the power required for the operation of the calibrator 3a is able to be supplied without any problems, and the occurrence of trouble such as the operation of the calibrator 3a stopping due to a power supply shortage no longer occurs. Consequently, in the present embodiment, the power source voltage VCC decreases when the converter 2 connected to the calibrator 3a is the converter 2 of a four-wire electromagnetic flowmeter, and it is therefore possible to suppress heat generated by the calibrator 3a and to suppress temperature drifts in electrical circuits due to internal heat generation, and it is subsequently possible to reduce the effect on the performance of the calibrator 3a caused by temperature drifts.

Furthermore, in the present embodiment, by providing the input circuit for measuring the current value in the input circuit 30a, the excitation current $I_{ex}$ is able to be accurately measured at the CPU 31a side, and therefore the setting of the model of the converter 2 is able to be automatically performed. Furthermore, in the present embodiment, it is possible to output a highly precise output voltage VAD1 that is proportional to the magnitude of the excitation current $I_{ex}$, and it is possible to accurately measure the excitation current $I_{ex}$ as described above, and therefore it is possible to generate a reference flow-rate signal corresponding to the value of the excitation current $I_{ex}$ and output the reference flow-rate signal to the converter 2, and it is possible to realize the calibration of the converter 2 of a two-wire electromagnetic flowmeter within a total flow-rate measurement range.

Furthermore, in the present embodiment, by providing the input circuit for detecting positive polarity and the input circuit for detecting negative polarity in the input circuit 30a, the polarity of the excitation current is able to be accurately detected. In the present embodiment, even in the case where a low-pass filter circuit is provided for the output of the input circuit for detecting positive polarity and the input circuit for detecting negative polarity, it becomes possible to set the time constant of the low-pass filter circuit in a manner that is optimized for detecting the polarity of the excitation current $I_{ex}$, and therefore a delay in the rising and falling of the output voltages VO1 and VO2 can be reduced and the speed at which changes in the polarity of the excitation current $I_{ex}$ are detected can be improved compared to the past.

It should be noted that the power source of the operational amplifier U2 is supplied from a power source voltage obtained by the power source voltage VCC being stepped up to a voltage (+VA) by the DC-DC converter 340, and therefore the operational amplifier U2 does not cause an input offset voltage drift (drift in the current measurement value) due to fluctuations in the power source voltage VCC, and the current measurement precision is not affected.

Second Embodiment

Figure 10:
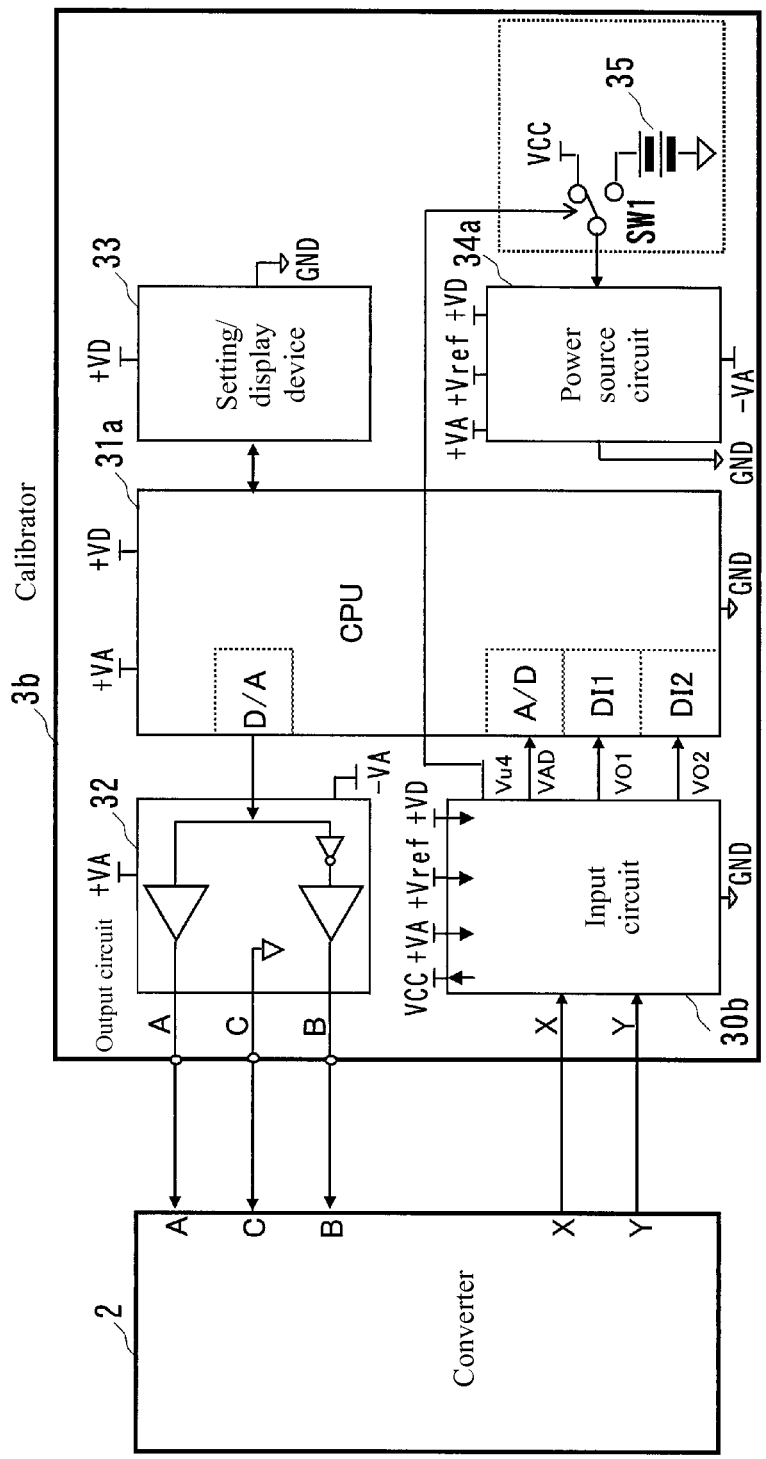
FIG. 10 is a block diagram illustrating the configuration of a calibrator according to a second embodiment of the present invention.

Next, a second embodiment of the present invention will be described. FIG. 10 is a block diagram illustrating the configuration of a calibrator according to the second embodiment of the present invention, and the same reference numerals are appended to the same components as in FIG. 1. A calibrator 3b of the present embodiment is configured from an input circuit 30b, the CPU 31a, the output circuit 32, the setting/display device 33, the power source circuit 34a, the battery 35, and a switch SW1. The operations of the CPU 31a, the output circuit 32, the setting/display device 33, and the power source circuit 34a are as described in the first embodiment.

Figure 11:
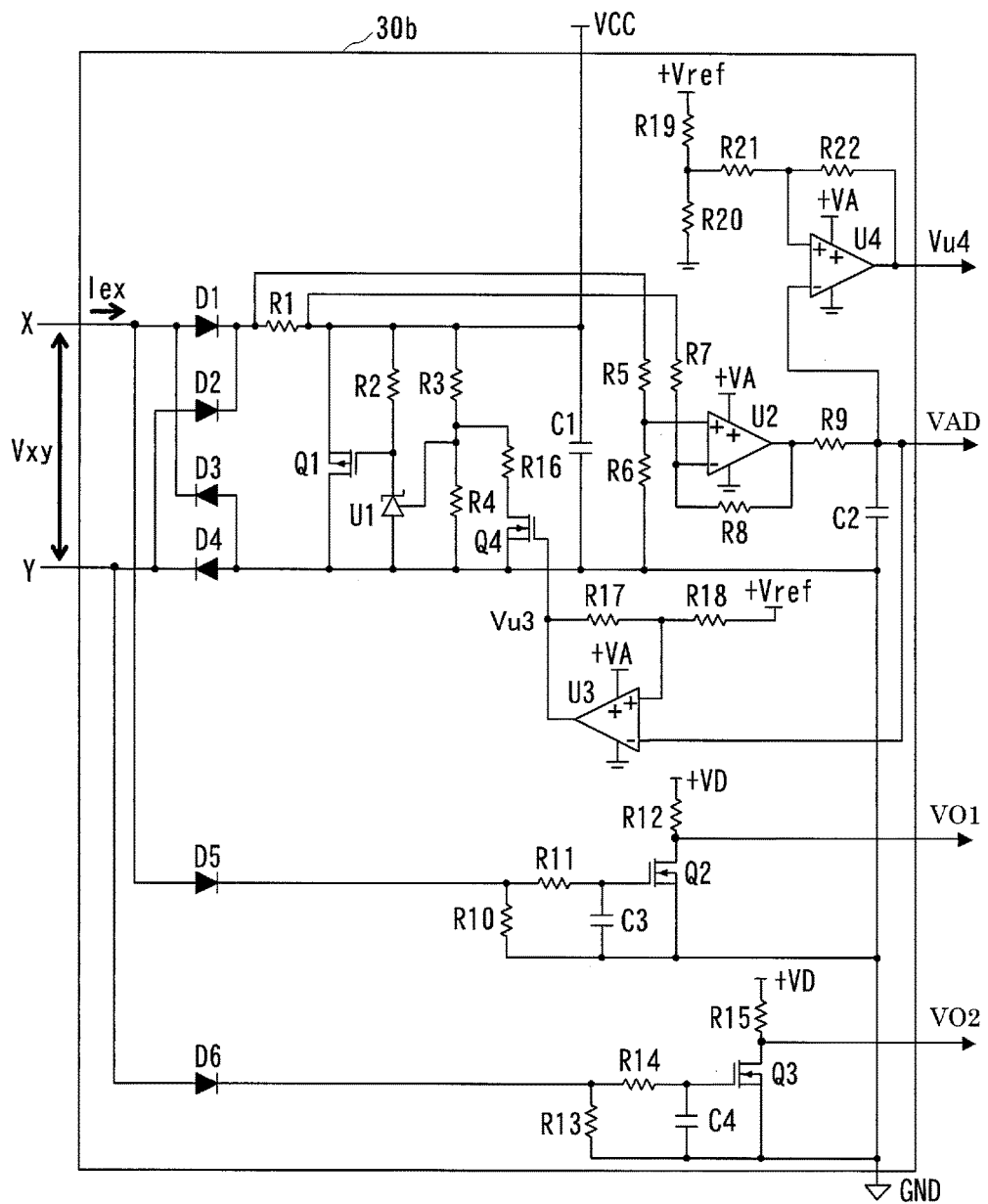
FIG. 11 is a circuit diagram illustrating the configuration of an input circuit of the calibrator according to the second embodiment of the present invention.
Figure 12:
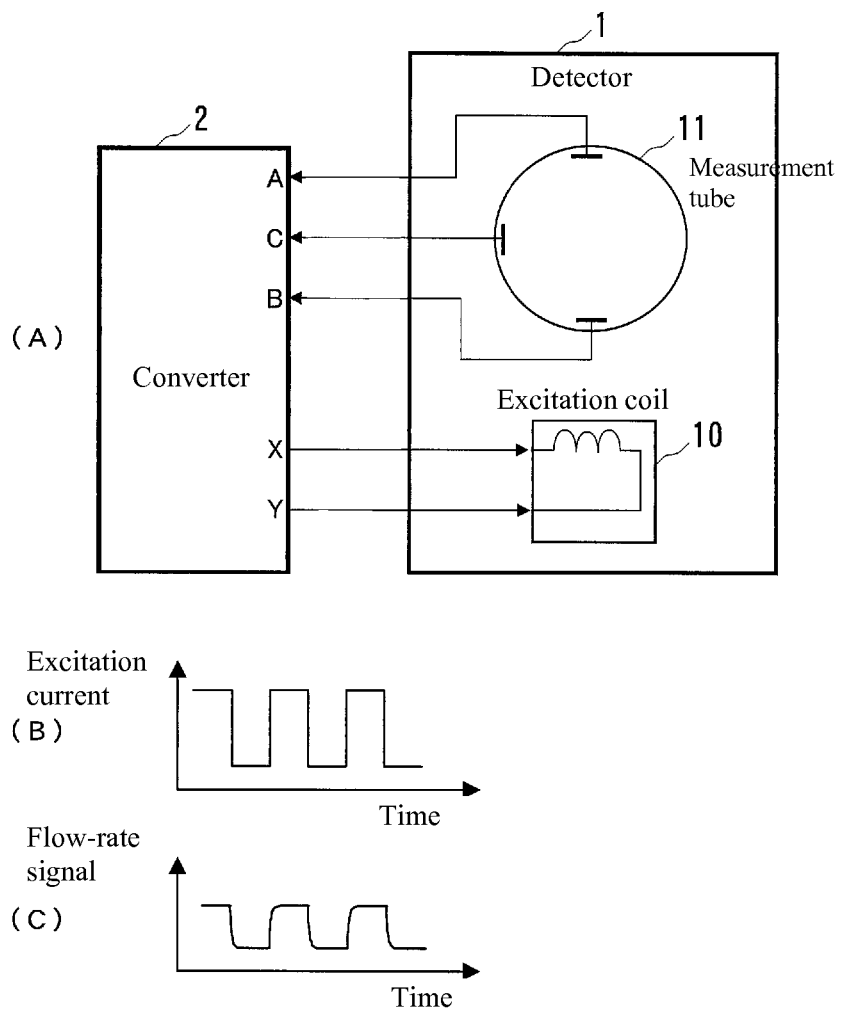
FIG. 12 is a block diagram illustrating the configuration of a conventional electromagnetic flowmeter and drawings illustrating signal waveforms of each section of the electromagnetic flowmeter.

FIG. 11 is a circuit diagram illustrating the configuration of the input circuit 30b of the present embodiment, and the same reference numerals are appended to the same components as in FIG. 2. The input circuit 30b is configured from: the diodes D1 to D6; the shunt regulator U1; the operational amplifier U2; the comparator U3; the P-channel power MOS transistor Q1; the N-channel power MOS transistors Q2 to Q4; the resistors R1 to R18; the capacitors C1 to C4; a comparator U4 that has a power source voltage (+VA) supplied to a power source input terminal, an inverting input terminal connected to a first signal output terminal of the input circuit 30b, and an output terminal connected to a fourth signal output terminal of the input circuit 30b; a resistor R19 having one end connected to a power source voltage (+$V_{ref}$); a resistor R20 having one end connected to the other end of the resistor R19 and the other end connected to ground; a resistor R21 having one end connected to a connection point between the resistors R19 and R20 and the other end connected to a noninverting input terminal of the comparator U4; and a resistor R22 having one end connected to the noninverting input terminal of the comparator U4 and the other end connected to the output terminal of the comparator U4.

The configuration of the input circuit 30a of the first embodiment does not pose any problems as long as the total power P required for the operation of the calibrator is able to be supplied with the full range of the excitation current $I_{ex}$ (approximately ±3.5 to 12 mA) supplied from the converter 2 of a two-wire electromagnetic flowmeter. However, the present embodiment is useful in the case where the required total power P is large, the excitation current $I_{ex}$ is within a lower range (less than 5 mA, for example) of the current supplied from the converter 2 of a two-wire electromagnetic flowmeter, and there is a current supply shortage even though the power source voltage VCC is set to be high.

The comparator U4, the resistors R19 to R22, and the switch SW1 configure a power source voltage supply source switching means. The comparator U4 sets an output voltage Vu4 to low when the output voltage VAD output to the first signal output terminal of the input circuit 30b is equal to or greater than a prescribed voltage threshold value TH2 (TH1>TH2). In this case, the switch SW1 supplies the power source voltage VCC output from the input circuit 30b to the power source circuit 34a, and therefore the operation of the calibrator 3a is as described in the first embodiment.

Furthermore, the comparator U4 outputs a high-level output voltage Vu4 when the output voltage VAD is less than the voltage threshold value TH2. In this case, the switch SW1 switches the source of the supply of the power source voltage to the power source circuit 34a from the input circuit 30b to the battery 35.

The voltage threshold value TH2 is set according to the power source voltage (+$V_{ref}$) and the values of the resistors R19 to R22. This voltage threshold value TH2 may be set to a voltage value corresponding to a current value (5 mA, for example) that is slightly larger than a value with which a state is entered where the total power P required for the operation of the calibrator 3b is not able to be obtained from the excitation current $I_{ex}$, in other words, a state where there is a current supply shortage with the excitation current $I_{ex}$. Consequently, before there is a current supply shortage with the excitation current $I_{ex}$, the output voltage Vu4 of the comparator U4 changes from low level to high level, and the source of the supply of the power source voltage to the power source circuit 34a is switched from the input circuit 30b to the battery 35.

As described above, in the present embodiment, it is possible to prevent there being a shortage in the power P required for the operation of the calibrator 3b by switching the supply source of the power source voltage from the input circuit 30b to the battery 35 when there is a current supply shortage with the excitation current $I_{ex}$. In the present embodiment, it is possible to eliminate the occurrence of trouble such as the operation of the calibrator 3b stopping due to a power supply shortage even when the excitation current $I_{ex}$ is within a lower range (less than 5 mA, for example) of the current supplied from the converter 2 of a two-wire electromagnetic flowmeter. Furthermore, a power source voltage is similarly supplied from the battery 35 to the power source circuit 34a in a pause period of the excitation current $I_{ex}$, and it is therefore possible to eliminate the occurrence of trouble such as the operation of the calibrator 3b stopping even when the pause period is long.

Furthermore, in the present embodiment, power is not supplied from the battery 35 when the excitation current $I_{ex}$ is within a range of the current supplied from the converter 2 of a four-wire electromagnetic flowmeter or is of a lower range or greater (5 mA or greater, for example) of the current supplied from the converter 2 of a two-wire electromagnetic flowmeter, and therefore the consumption of the battery 35 is able to be greatly reduced compared to the case where only the battery 35 is used as in the conventional calibrator 3.

It should be noted that, in the first and second embodiments, the portion of a determination means including the comparator U3 and the resistors R17 and R18 from among the power source voltage switching means including the comparator U3, the N-channel power MOS transistor Q4, and the resistors R17 and R18 may be realized with the CPU 31a. In this case, the CPU 31a may set the N-channel power MOS transistor Q4 to OFF when the output voltage VAD is equal to or greater than the voltage threshold value TH1, and set the N-channel power MOS transistor Q4 to ON when the output voltage VAD is less than the voltage threshold value TH1.

Furthermore, in the second embodiment, the portion of a determination means including the comparator U4 and the resistors R19 to R22 from among the power source voltage supply source switching means including the comparator U4, the resistors R19 to R22, and the switch SW1 may be realized with the CPU 31a. In this case, the CPU 31a may control the switch SW1 such that the supply source of the power source voltage to the power source circuit 34a becomes the input circuit 30b when the output voltage VAD is equal to or greater than the voltage threshold value TH2, and may control the switch SW1 such that the supply source of the power source voltage to the power source circuit 34a becomes the battery 35 when the output voltage VAD is less than the voltage threshold value TH2.

INDUSTRIAL APPLICABILITY

The present invention can be applied to technology for calibrating a converter of an electromagnetic flowmeter.

DESCRIPTION OF REFERENCE NUMERALS

2 . . . converter;
3a . . . calibrator;
30a, 30b . . . input circuit;
31a . . . CPU
32 . . . output circuit;
33 . . . setting/display device;
34a . . . power source circuit;
35 . . . battery;
340 to 343 . . . DC-DC converter;
D1 to D6 . . . diode;
U1 . . . shunt regulator;
U2 . . . operational amplifier;
U3, U4 . . . comparator;
Q1 . . . P-channel power MOS transistor;
Q2 to Q4 . . . N-channel power MOS transistor;
R1 to R22 . . . resistor
C1 to C4 . . . capacitor
SW1 . . . switch.

The invention claimed is:

1. A standard signal generator that generates a reference flow-rate signal for calibrating an electromagnetic flowmeter, the standard signal generator comprising:
   an input circuit that receives an excitation current from a converter of the electromagnetic flowmeter;
   a control unit configured to generate the reference flow-rate signal synchronized with the excitation current; and
   a power source voltage switch,
   wherein the input circuit comprises:
      a first rectification circuit configured to rectify the excitation current;
      a first resistor that is provided between a power source voltage output terminal and configured to supply a power source voltage used by the standard signal generator and an output terminal of the first rectification circuit;
      an amplification circuit configured to output a first output voltage obtained by amplifying a voltage across both ends of the first resistor thereof; and
      a constant voltage circuit configured to perform control such that the power source voltage that is output from the power source voltage output terminal is constant,
   wherein the power source voltage switch is configured to switch the power source voltage with the constant voltage circuit being controlled in accordance with a result of a comparison between the first output voltage and a prescribed first threshold value.

2. The standard signal generator according to claim 1, wherein the power source voltage switch is configured to set the power source voltage to a prescribed first level when the first output voltage is equal to or greater than the first threshold value, and wherein the power source voltage switch is configured to set the power source voltage to a prescribed second level that is higher than the first level when the first output voltage is less than the first threshold value.

3. The standard signal generator according to claim 1, wherein the constant voltage circuit comprises:
- a transistor that is provided between the power source voltage output terminal and a ground; and
- a shunt regulator that is configured to control a gate voltage of the transistor with a voltage obtained by resistance-dividing the power source voltage that is output from the power source voltage output terminal serving as a reference input,
- wherein the power source voltage switch is configured to switch the power source voltage by changing the reference input of the shunt regulator in accordance with the result of the comparison between the first output voltage and the prescribed first threshold value.

4. The standard signal generator according to claim 2, wherein the constant voltage circuit comprises:
- a transistor that is provided between the power source voltage output terminal and a ground; and
- a shunt regulator that is configured to control a gate voltage of the transistor with a voltage obtained by resistance-dividing the power source voltage that is output from the power source voltage output terminal serving as a reference input,
- wherein the power source voltage switch is configured to switch the power source voltage by changing the reference input of the shunt regulator in accordance with the result of the comparison between the first output voltage and the prescribed first threshold value.

5. The standard signal generator according to claim 1, wherein the standard signal generator further comprises:
- a battery configured to supply power; and
- a power source voltage supply source switch configured to switch a supply source of the power source voltage from the constant voltage circuit of the input circuit to the battery when the first output voltage is compared with a prescribed second threshold value and it is determined that there is a current supply shortage with the excitation current.

6. The standard signal generator according to claim 2, wherein the standard signal generator further comprises:
- a battery configured to supply power; and
- a power source voltage supply source switch configured to switch a supply source of the power source voltage from the constant voltage circuit of the input circuit to the battery when the first output voltage is compared with a prescribed second threshold value and it is determined that there is a current supply shortage with the excitation current.

7. The standard signal generator according to claim 3, wherein the standard signal generator further comprises:
- a battery configured to supply power; and
- a power source voltage supply source switch configured to switch a supply source of the power source voltage from the constant voltage circuit of the input circuit to the battery when the first output voltage is compared with a prescribed second threshold value and it is determined that there is a current supply shortage with the excitation current.

8. The standard signal generator according to claim 4, wherein the standard signal generator further comprises:
- a battery configured to supply power; and
- a power source voltage supply source switch configured to switch a supply source of the power source voltage from the constant voltage circuit of the input circuit to the battery when the first output voltage is compared with a prescribed second threshold value and it is determined that there is a current supply shortage with the excitation current.

9. The standard signal generator according to claim 1, wherein the control unit is configured to determine a model of the converter connected to the standard signal generator in accordance with the first output voltage that is output from the input circuit, and wherein the control unit is configured to generate a reference flow-rate signal corresponding to a determined model and output the reference flow-rate signal to the converter.

10. The standard signal generator according to claim 2, wherein the control unit is configured to determine a model of the converter connected to the standard signal generator in accordance with the first output voltage that is output from the input circuit, and wherein the control unit is configured to generate a reference flow-rate signal corresponding to a determined model and output the reference flow-rate signal to the converter.

11. The standard signal generator according to claim 3, wherein the control unit is configured to determine a model of the converter connected to the standard signal generator in accordance with the first output voltage that is output from the input circuit, and wherein the control unit is configured to generate a reference flow-rate signal corresponding to a determined model and output the reference flow-rate signal to the converter.

12. The standard signal generator according to claim 4, wherein the control unit is configured to determine a model of the converter connected to the standard signal generator in accordance with the first output voltage that is output from the input circuit, and wherein the control unit is configured to generate a reference flow-rate signal corresponding to a determined model and output the reference flow-rate signal to the converter.

13. The standard signal generator according to claim 9, wherein the control unit, when having determined that the converter of the electromagnetic flowmeter connected to the standard signal generator is a converter of a two-wire electromagnetic flowmeter, is configured to generate a reference flow-rate signal corresponding to a value of the excitation current indicated by the first output voltage and output the reference flow-rate signal to the converter.

14. The standard signal generator according to claim 10, wherein the control unit, when having determined that the converter of the electromagnetic flowmeter connected to the standard signal generator is a converter of a two-wire electromagnetic flowmeter, is configured to generate a reference flow-rate signal corresponding to a value of the excitation current indicated by the first output voltage and output the reference flow-rate signal to the converter.

15. The standard signal generator according to claim 11, wherein the control unit, when having determined that the converter of the electromagnetic flowmeter connected to the standard signal generator is a converter of a two-wire electromagnetic flowmeter, is configured to generate a reference flow-rate signal corresponding to a value of the excitation current indicated by the first output voltage and output the reference flow-rate signal to the converter.

16. The standard signal generator according to claim 12, wherein the control unit, when having determined that the converter of the electromagnetic flowmeter connected to the standard signal generator is a converter of a two-wire electromagnetic flowmeter, is configured to generate a reference flow-rate signal corresponding to a value of the excitation current indicated by the first output voltage and output the reference flow-rate signal to the converter.

17. The standard signal generator according to claim 1, wherein the input circuit further comprises: a second rectification circuit that is configured to rectify only a positive polarity side of the excitation current;

a second resistor that is provided between an output terminal of the second rectification circuit and the ground;

a third rectification circuit that is configured to rectify only a negative polarity side of the excitation current; and a third resistor that is provided between an output terminal of the third rectification circuit and the ground, wherein the control unit is configured to determine a polarity of the excitation current in accordance with a second output voltage that is a voltage across both ends of the second resistor and a third output voltage that is the voltage across both ends of the third resistor, wherein the control unit is configured to generate and output a positive-polarity reference flow-rate signal to the converter when having determined that the excitation current has a positive polarity, and wherein the control unit is configured to generate and output a negative-polarity reference flow-rate signal to the converter when having determined that the excitation current has a negative polarity.

18. The standard signal generator according to claim 2, wherein the input circuit further comprises: a second rectification circuit that is configured to rectify only a positive polarity side of the excitation current;

a second resistor that is provided between an output terminal of the second rectification circuit and the ground;

a third rectification circuit that is configured to rectify only a negative polarity side of the excitation current; and a third resistor that is provided between an output terminal of the third rectification circuit and the ground, wherein the control unit is configured to determine a polarity of the excitation current in accordance with a second output voltage that is a voltage across both ends of the second resistor and a third output voltage that is the voltage across both ends of the third resistor, wherein the control unit is configured to generate and output a positive-polarity reference flow-rate signal to the converter when having determined that the excitation current has a positive polarity, and wherein the control unit is configured to generate and output a negative-polarity reference flow-rate signal to the converter when having determined that the excitation current has a negative polarity.

19. The standard signal generator according to claim 3, wherein the input circuit further comprises: a second rectification circuit that is configured to rectify only a positive polarity side of the excitation current;

a second resistor that is provided between an output terminal of the second rectification circuit and the ground;

a third rectification circuit that is configured to rectify only a negative polarity side of the excitation current; and a third resistor that is provided between an output terminal of the third rectification circuit and the ground, wherein the control unit is configured to determine a polarity of the excitation current in accordance with a second output voltage that is a voltage across both ends of the second resistor and a third output voltage that is the voltage across both ends of the third resistor, wherein the control unit is configured to generate and output a positive-polarity reference flow-rate signal to the converter when having determined that the excitation current has a positive polarity, and wherein the control unit is configured to generate and output a negative-polarity reference flow-rate signal to the converter when having determined that the excitation current has a negative polarity.

20. The standard signal generator according to claim 4, wherein the input circuit further comprises: a second rectification circuit that is configured to rectify only a positive polarity side of the excitation current;

a second resistor that is provided between an output terminal of the second rectification circuit and the ground;

a third rectification circuit that is configured to rectify only a negative polarity side of the excitation current; and a third resistor that is provided between an output terminal of the third rectification circuit and the ground, wherein the control unit is configured to determine a polarity of the excitation current in accordance with a second output voltage that is a voltage across both ends of the second resistor and a third output voltage that is the voltage across both ends of the third resistor, wherein the control unit is configured to generate and output a positive-polarity reference flow-rate signal to the converter when having determined that the excitation current has a positive polarity, and wherein the control unit is configured to generate and output a negative-polarity reference flow-rate signal to the converter when having determined that the excitation current has a negative polarity.

* * * * *